United States Patent [19]

Lesti et al.

[11] Patent Number: 4,930,560
[45] Date of Patent: Jun. 5, 1990

[54] RADIAL TIRE FOR MOTOR VEHICLES

[75] Inventors: Franco Lesti, Rome, Italy; Jean M. Carpentier, Labuissiere, France

[73] Assignee: Bridgestone/Firestone, Inc., Akron, Ohio

[21] Appl. No.: 339,543

[22] Filed: Apr. 17, 1989

[30] Foreign Application Priority Data

Apr. 27, 1988 [IT] Italy .............................. 67385 A/88

[51] Int. Cl.[5] .......................................... B60C 15/06
[52] U.S. Cl. .................................. 152/554; 152/510; 152/546
[58] Field of Search ............... 152/543, 546, 552, 554, 152/560, 510

[56] References Cited

U.S. PATENT DOCUMENTS

| | | |
|---|---|---|
| 1,918,539 | 7/1933 | Handy . |
| 3,297,073 | 1/1967 | Black et al. . |
| 3,299,934 | 1/1967 | Pace .................................. 152/510 X |
| 4,109,551 | 4/1977 | Kolowski et al. . |
| 4,139,040 | 2/1979 | Samoto et al. . |
| 4,226,655 | 10/1980 | Bush ................................. 152/543 X |
| 4,236,563 | 12/1980 | Moers et al. . |
| 4,241,775 | 12/1980 | Jackson . |
| 4,258,775 | 3/1981 | Samoto . |
| 4,261,405 | 4/1981 | Yamauchi et al. . |
| 4,854,361 | 8/1989 | Gasowski et al. .................. 152/552 |

FOREIGN PATENT DOCUMENTS 382164 9/1923 Fed. Rep. of Germany .
245219 2/1926 Italy .

Primary Examiner—Raymond Hoch
Attorney, Agent, or Firm—Ernst H. Ruf

[57] ABSTRACT

A radial tire (20) for motor vehicles, on which a body ply (6) presents two lateral portions (8) turned substantially 360° about respective beads (4) and joined, by an end portion (9), to the outer surface of a center portion (7) of the body ply (6) immediately over the beads (4); each lateral portion (8) of the body ply (6) turned about the bead (4) being gripped between an innerliner (10) and an outer abrasion strip (12) integral with each other; and each abrasion strip (12) presenting a section of varying thickness, to compensate for the absence of a bead filler.

2 Claims, 1 Drawing Sheet

RADIAL TIRE FOR MOTOR VEHICLES

TECHNICAL FIELD

The present invention relates to a radial tire for motor vehicles.

BACKGROUND OF THE ART

Radial tires for motor vehicles are generally known to present, along the inner periphery, two metal beads, each fitted, along the outer periphery, with an elastomeric filler usually in the form of a substantially triangular section wing. Each bead and respective filler are covered by a respective lateral portion of a body ply, the end portion of which is joined to the outer surface of a center portion of the body ply over the outer end of the filler. The inner and outer surfaces of the package so formed are usually covered with an innerliner and abrasion strip respectively. The innerliner and abrasion strip are integral with each other, usually of substantially constant thickness, and turned about a respective lateral portion of the body ply.

These fillers were not usually featured on diagonal tires, the required lateral rigidity of which was provided for by a number of diagonal cross plies. As these are absent on radial tires, however, the fillers have always been considered essential for ensuring sufficient lateral rigidity. The fillers which even today are considered indispensable by radial tire manufacturers, involve a number of drawbacks both in terms of design and cost.

First, a preassembly line parallel with the tire assembly line is required for forming and preassembling the metal beads and fillers, which are then fed on to the tire assembly line. In addition to the outlay involved for preassembling the beads and fillers, such a system rules out practically any possibility of the metal beads being formed automatically during tire assembly, and involves the use of complex equipment for feeding the bead-filler packages on to the tire building drum.

Second, the fillers require the use of extremely wide body plies, each turned-up lateral portion of which must be long enough to cover the surface of the filler facing outwards of the tire, and also join up with the outer surface of the center portion of the body ply.

Finally, the presence of the fillers, the mix of which obviously differs from that of the surrounding parts, may result in a poorly homogeneous bead area and, consequently, may cause curing problems. Despite the rubber industry now being in a position to overcome problems of this sort, even the slightest variation in the mix of any one of the components in the bead area of a radial tire inevitably means varying the mix of all the component parts involved, for ensuring curing is performed as homogeneously as possible.

Notwithstanding the above precautions, however, the bead areas of radial tires are still considered "critical" by manufacturers, due to the severe stress they are subjected to, and the presence of a number of superimposed nonhomogenous layers bonded together.

DISCLOSURE OF THE INVENTION

The aim of the present invention is to provide a radial tire without the use of the noted fillers. With this aim in view, according to the present invention, there is provided a radial tire for motor vehicles, this tire comprising two metal beads; a body ply comprising two lateral portions, each turned about a respective metal bead and joined, by an end portion, to the outer surface of a main or center portion of the body ply over the respective bead; and an innerliner and outer abrasion strip integral with each other, and turned about each lateral portion of said body ply; characterized by the fact that each said lateral portion of the body ply is turned substantially 360° about a respective metal bead; said end portion of each lateral portion of the body ply joining with the center portion of the body ply immediately over the respective bead; and the abrasion strip presenting a section varying in thickness, so as to compensate for the absence of a bead filler.

A non-limiting embodiment of the present invention will be described by way of example with reference to the accompanying drawings.

BEST MODE FOR CARRYING OUT THE INVENTION

Figure 1:
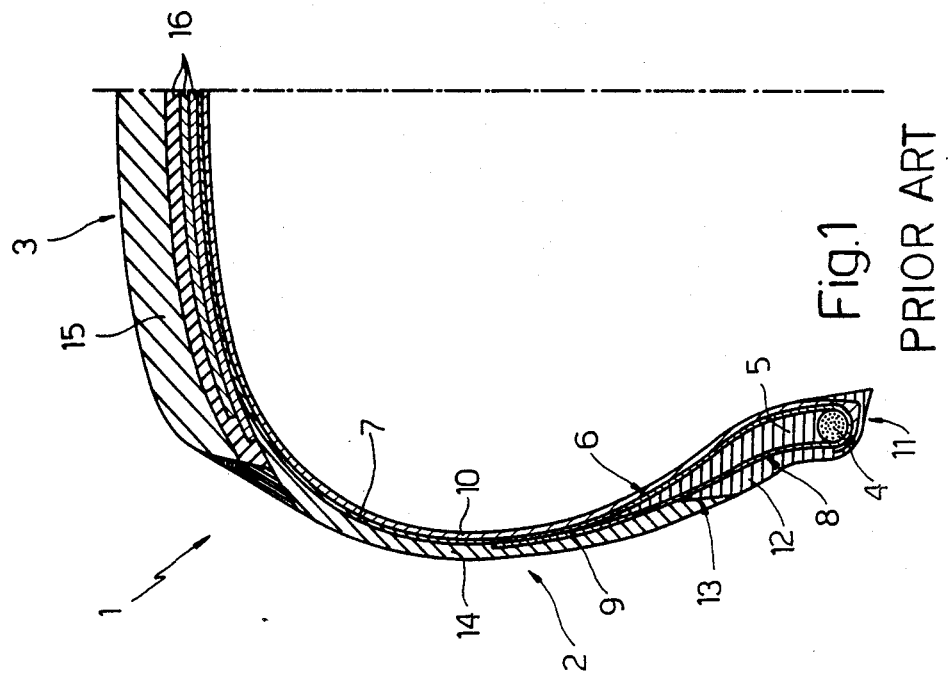
FIG. 1 shows a partial cross section of a known prior art radial tire.

Number 1 in FIG. 1 indicates a known radial tire comprising an inner radial carcass 2 and an outer carcass 3. Along the inner periphery of carcass 2, there are provided two metal beads 4 (only one of which is shown), each fitted along its outer periphery with a substantially triangular filler 5 extending from bead 4 in the direction of outer carcass 3.

Inner carcass 2 also comprises a body ply 6 having a main or center portion 7 extending between beads 4, and two lateral portions 8, each turned about a respective bead 4. Each lateral portion 8 consists of a first portion covering part of bead 4 and the surface of respective filler 5 facing outwards of tire 1; and an end portion 9 extending beyond respective filler 5 and joining with the outer surface of center portion 7.

Inner carcass 2 also comprises a cover layer consisting of an innerliner 10 of substantially constant thickness, each lateral edge of which is connected, via a first splice 11, to the inner lateral edge of an abrasion strip 12 of substantially constant thickness, the outer lateral edge of which is connected, via a second splice 13, to the inner edge of a sidewall 14 also of substantially constant thickness.

In more detail, innerliner 10 covers the entire inner surface of center portion 7 of body ply 6, and is turned partially in the form of a U-shape about each bead 4 at splice 11, whereas abrasion strips 12 and sidewalls 14 cover the outer lateral surface of tire 1. Naturally, each abrasion strip 12 is also turned substantially in the form of a U-shape about respective bead 4 at splice 11. The outer lateral edge of each sidewall 14 blends with a respective lateral edge of carcass 3, which comprises a tread 15 reinforced internally by tread plies 16.

Figure 2:
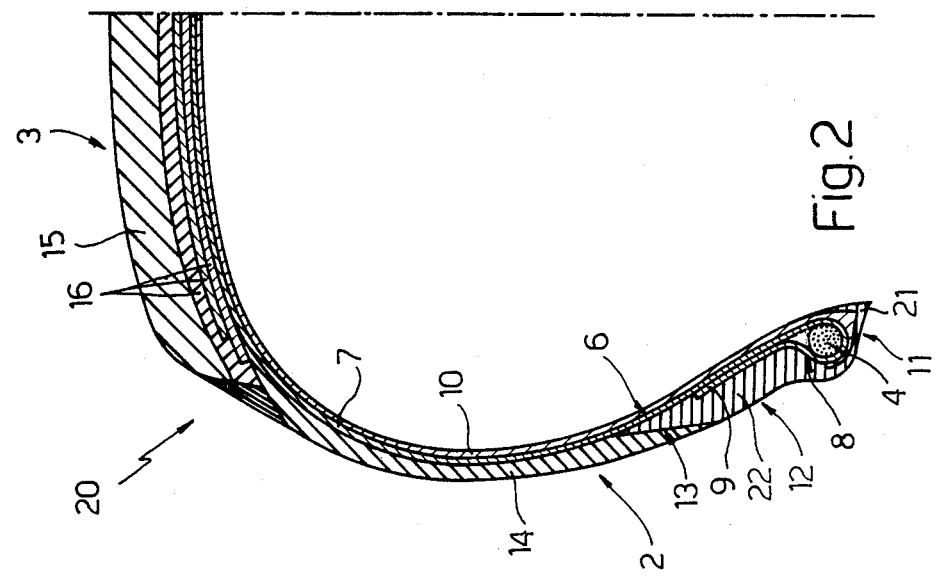
FIG. 2 shows a partial cross section of a preferred embodiment of the radial tire according to the present invention.

FIG. 2 shows a radial tire 20 constituting a preferred embodiment of the present invention, and the corresponding component parts of which are numbered as on prior art tire 1. The first noticeable difference between tires 1 and 20 is that, on tire 20, filler 5 has been dispensed with, and each lateral portion 8 of body ply 6 is turned substantially 360° about respective bead 4 and joined by end portion 9 to center or main portion 7 immediately outwards of bead 4. Consequently, whereas end portions 9 of tires 1 and 20 present substantially the same width, the total width of lateral portion 8 of body ply 6 on tire 20 is far less than on tire 1. In addition, the bead area of tire 20 is far more homogeneous than on tire 1, and, by virtue of center portion 7 and each lateral portion 8 of body ply 6 being formed from the same material, lateral portions 8 of body ply 6 on tire 20 knit perfectly with center portion 7 during curing, to form a single body enclosing bead 4.

A further difference between tires 1 and 20 is that, whereas innerliners 10 of tires 1 and 20 are of substantially constant thickness, like abrasion strip 12 on tire 1, abrasion strip 12 on tire 20 presents a section of varying thickness and generally thicker than that of strip 12 on tire 1, so as to compensate for the absence of filler 5.

In more detail, each abrasion strip 12 comprises a first and second portion, 21 and 22, the average thickness of the first being less than that of the second. The said portion 21 is turned substantially in the form of a U-shape about respective bead 4, and is superimposed on a corresponding portion of innerliner 10; whereas portion 22 extends outwards of respective bead 4 and in contact with respective end portion 9 of body ply 6.

Tests conducted on radial tires formed as in FIG. 2 have shown that the increased thickness of abrasion strip 12 and improved mechanical connection of the components in the bead area of tire 20 provide for at least the same transverse rigidity as on conventional tire 1. In other words, tire 20 not only provides for overcoming the drawbacks associated with fillers 5 on tire 1 but, for a given tire size, also enables the use of narrower innerliners 10, thus reducing both cost and, above all, weight.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. A radial tire for motor vehicles, said tire comprising two metal beads; a body ply comprising two lateral portions, each turned about a respective metal bead and joined by an end portion to the outer surface of a main portion of the body ply over a respective bead; and an innerliner and outer abrasion strip integral with each other, and turned about each lateral portion of said body ply; characterized by the fact that each lateral portion of said body ply is turned substantially 360° about a respective metal bead; said end portion of each lateral portion of said body ply joining with the main portion of said body ply immediately over the respective bead; said abrasion strip presenting a section varying in thickness, with a portion of said abrasion strip being located substantially radially outwards of the respective bead and in contact with the respective end portion of said body ply, with no bead filler being provided.

2. A tire as claimed in claim 1 characterized by the fact that each abrasion strip comprises a first and second portion, the average thickness of the first portion being less than that of the second portion; said first portion of each abrasion strip bring turned substantially in the form of a U-shape about the respective bead, with said second portion of each abrasion strip extending outwards of the respective bead.

* * * * *